_Patented Oct. 23, 1951_ 2,572,039

UNITED STATES PATENT OFFICE 2,572,039

MANUFACTURE OF CELLULOSE ETHERS

Eugene D. Klug and Howard G. Tennent, Wilmington, Del., assignors to Hercules Powder Company, Wilmington, Del., a corporation of Delaware No Drawing. Application November 4, 1949, Serial No. 125,642

10 Claims. (Cl. 260—231)

1

This invention relates to the manufacture of cellulose ethers and particularly to an improvement in the manufacture of hydroxyalkyl ethers of cellulose.

Various methods have been proposed and utilized for the preparation of hydroxyalkyl derivatives of cellulose and other carbohydrates. Generally, the processes heretofore proposed have been found deficient in simplicity and economy and the products obtained have lacked desired uniformity and desired solubility.

It has now been discovered that hydroxyalkyl ethers of cellulose may be prepared by reacting cellulose with a hydroxyalkylating agent in the presence of an alkali in a medium comprising an alcohol of the group consisting of the secondary 3-carbon and secondary and tertiary 4-, and 5-carbon aliphatic alcohols and mixtures thereof in which the alcohol is present in a sufficient quantity to maintain the resulting cellulose ether in an undissolved state through the process.

As illustrative of a preferred embodiment of the invention, cellulose in particulate form is suspended in an alcohol, for example, tert-butyl alcohol, and an aqueous solution of caustic alkali is added with agitation. A hydroxyalkylating agent such as an alkylene oxide is added to the suspension and the reaction is allowed to proceed under mild temperature conditions to form a hydroxyalkyl cellulose ether. The resulting product in particulate form is then simply recovered by draining or centrifuging the liquid medium and washing the solid product to remove impurities. The resulting product is a hydroxyalkyl cellulose ether characterized by very uniform solubility and is in substantially the same physical state or particulate form as the cellulose used as the starting material.

The simplicity and economy involved in recovering the etherified product in accordance with this invention are evident. The very uniform solubility of the resulting product is most surprising since the product is in substantially the same physical state as the cellulose used as the starting material. Moreover, it has been generally thought that ethylene oxide, for example, would react with the secondary 3-carbon and secondary and tertiary 4-, and 5-carbon aliphatic alcohols to form ethers due to the catalytic effect imposed in the presence of alkali. Although it is not intended that the invention shall be limited to any particular theory of operation, it appears that the alcohols utilized in accordance with this invention permit a more uniform substitution which in turn is reflected in a

2 very uniform solubility characteristic through a wide range of hydroxyalkyl substitution.

The following examples set forth various ways in which the principle of the invention has been practiced. It is to be understood, however, that the examples are purely illustrative and are not to be construed as a limitation of the invention.

EXAMPLE 1

In a reactor provided with a mechanical agitator, a suspension of 30 parts by weight of shredded cotton linters and 850 parts by volume of substantially anhydrous tert-butyl alcohol was vigorously agitated while adding 60 parts by weight of 20% aqueous sodium hydroxide solution over a period of about 15 minutes, and agitation was continued for about 30 minutes at room temperature, after which a solution of 17.8 parts by weight of ethylene oxide in 50 parts by volume of substantially anhydrous tert-butyl alcohol was added. The reaction mixture was heated to a temperature between 29° C. and 34° C. in about 1 hour and was held within this temperature range for an additional 5-hour period with agitation. At this stage, the reaction mixture was a suspension with the hydroxyethyl cellulose thus produced suspended in substantially the same particulate form as the starting cellulosic material. It was then allowed to cool and to stand at room temperature for approximately 16 hours.

To recover the cellulose ether from the reaction mixture, the liquor was drained off and the hydroxyethyl cellulose was stirred in a 70% solution of methanol in water, neutralized to phenolphthalein with acetic acid, washed free of salts with 70% methanol, dehydrated with anhydrous methanol, and dried at 70° C. The product was analyzed for hydroxyethyl content according to the method of P. W. Morgan (Industrial and Engineering Chemistry, 18, 500–504, 1946) and was found to have a substitution of about 0.61 hydroxyethyl group for each anhydroglucose unit in the cellulose. A 2% solution of the product in 5% aqueous sodium hydroxide was clear, smooth, and substantially free of insoluble fibers, thus indicating a very uniform product of excellent solubility characteristics.

EXAMPLES 2–6

These examples illustrate the preparation of hydroxyethyl cellulose of different degrees of substitution. The quantities of reagents and conditions employed in each example are set forth in the following table.

The general procedure followed in each example consisted in vigorously agitating a suspension of cotton linters in particulate form in the alcoholic medium in a reaction vessel provided with a mechanical agitator while the sodium hydroxide solution was introduced over a period from 5 to about 15 minutes, and agitation was continued for an additional period of about 30 minutes at room temperature, after which the ethylene oxide dissolved in from about 50 to about 100 parts by volume of the same alcohol serving as the suspending medium for the reaction was added to the reaction mixture. The temperature in all examples was kept at approximately room temperature up to this point. Agitation was then continued for 6 more hours, about 1 hour of the 6 being required to bring the reaction temperature to the desired level, as set forth in the following table. After this 6-hour period, the reaction mixture in each example was a suspension with the hydroxyethyl cellulose thus produced suspended in substantially the same particulate form as the starting cellulose. The cellulose ether in each example was recovered in accordance with the procedure given in Example 1.

Table

| Example [1] | Diluent [2] (Parts by Volume) | Sodium [3] Hydroxide Solution | | Ethylene Oxide Wt. (Parts) | Reaction | | Standing Time (Hrs.) | Degree of Substitution | Solubility of 2% Solution in 5% Sodium Hydroxide |
|---|---|---|---|---|---|---|---|---|---|
| | | Conc. (Per cent) | Wt. (Parts) | | Temp., °C. | Time (Hrs.) | | | |
| 2 | 950 Isopropanol [4] | 20 | 60 | 17.8 | 31-34 | 6 | 16 | 0.365 | Excellent. |
| 3 | 850 Isopropanol | 20 | 60 | 4.45 | 30-31 | 6 | 16 | 0.11 | Do. |
| 4 | 950 Tert-butanol [5] | 20 | 60 | 4.45 | 30-34 | 6 | 16 | 0.105 | Do. |
| 5 | ......do | 20 | 60 | 8.9 | 42-55 | 6 | 0 | 0.275 | Do. |
| 6 | ......do | 20 | 60 | 13.3 | 30-33 | 6 | 64 | 0.92 | Do. |

[1] Thirty parts by weight of cellulose was employed in each of Examples 2-6, inclusive.
[2] The values represent total diluent and include the diluent employed initially to suspend the cellulosic material and the diluent employed as the ethylene oxide solvent.
[3] The values take into account all water which was introduced into the reaction mixture.
[4] The isopropanol employed in Examples 2 and 3 was substantially anhydrous.
[5] The tert-butanol employed in Examples 4, 5 and 6 was substantially anhydrous.

With reference to the above Examples 2-6, it will be noted that excellent solubility was obtained over a wide range of substitution. The term "excellent" as used herein means that the solution was clear, smooth, and substantially free of insoluble fibers, thus indicating very uniform products of excellent solubility characteristics.

EXAMPLE 7

To a vigorously agitated suspension of 60 parts by weight of air dry, shredded cotton linters in 850 parts by volume of substantially anhydrous isopropanol was added 114 parts by weight of 15.8% aqueous sodium hydroxide solution over a period of about 13 minutes, and agitation was continued for 1 hour at room temperature, after which a solution of 17.8 parts by weight of ethylene oxide in 50 parts by volume of substantially anhydrous isopropanol was added. The reaction mixture was heated with continued agitation to a temperature between 55° C. and 60° C. in 1 hour and was held within this temperature range for 5 more hours with agitation. At this stage, the reaction mixture was a suspension with the hydroxyethyl cellulose thus produced suspended in substantially the same particulate form as the starting cellulose. The hydroxyethyl cellulose was recovered from the reaction mixture by the recovery procedure given in Example 1.

The product was found to have a substitution of about 0.565 hydroxyethyl group for each anhydroglucose unit in the cellulose. A 2% solution of the product in 5% aqueous sodium hydroxide was clear, smooth, and substantially free of insoluble fibers, thus indicating a very uniform product of excellent solubility characteristics.

EXAMPLE 8

Preparation of hydroxyethyl cellulose employing ethylene chlorohydrin as the hydroxyethylating agent.

To a vigorously agitated suspension of 60 parts by weight of cotton linters ground to pass a 40-mesh screen in 750 parts by volume of 87% isopropanol was added 54.8 parts by weight of 50% aqueous sodium hydroxide over a period of about 6 minutes, and agitation was continued at room temperature for 1 hour, after which 18.9 parts by weight of ethylene chlorohydrin was added. The reaction mixture was heated with continued agitation to a temperature between 65° C. and 69° C. in 1 hour and was held within this temperature range for 5 more hours with agitation. At this stage, the reaction mixture was a suspension with the hydroxyethyl cellulose thus produced suspended in substantially the same particulate form as the starting cellulose. The hydroxyethyl cellulose was recovered from the reaction mixture by the recovery procedure given in Example 1.

The product was found to have a substitution of about 0.32 hydroxyethyl group for each anhydroglucose unit in the cellulose. A 2% solution of the product in 5% aqueous sodium hydroxide was clear, smooth, and substantially free of insoluble fibers, thus indicating a very uniform product of excellent solubility characteristics.

EXAMPLE 9

Preparation of hydroxypropyl cellulose.

To a vigorously agitated suspension of 1 part by weight of cotton linters ground to pass a 40-mesh screen in 50 parts by volume of substantially anhydrous tert-butyl alcohol was added dropwise 2 parts by weight of 20% aqueous sodium hydroxide, and agitation was continued for 1 hour at room temperature. Thirty-six parts by volume of the tert-butyl alcohol was then drained off, and the alkali cellulose, suspended in the remaining 14 parts by volume of alcoholic medium, was transferred to a pressure vessel, after which 0.5 part by volume of propylene oxide dissolved in 10 parts by volume of the alcohol which had been drained off was added to the alkali cellulose suspension and the vessel was sealed. The vessel and contents were then heated at a temperature between 135° C. and 140° C. for 16 hours, cooled to room temperature and opened. The reaction mixture was a suspension with the hydroxypropyl cellulose thus produced suspended in substantially the same particulate form as the starting cellulose.

To recover the hydroxypropyl cellulose from the reaction mixture, the liquor was drained off, the cellulose ether was suspended in anhydrous methanol and neutralized to phenolphthalein with acetic acid, after which it was washed with anhydrous methanol and dried in vacuum at 70° C. The product contained by analysis 45.5% carbon and 1.75% ash (as sodium sulfate), equivalent to 2% ash as sodium acetate. The carbon content, corrected for the sodium acetate content, was 45.8%. This corresponds to a substitution of about 0.19 hydroxypropyl group for each anhydroglucose unit in the cellulose. A 2% solution of the product in 5% aqueous sodium hydroxide was clear, smooth, and substantially free of insoluble fibers, thus indicating a very uniform product of excellent solubility characteristics.

EXAMPLE 10

Preparation of hydroxyethyl cellulose employing tert-amyl alcohol as the alcoholic medium in the reaction mixture.

To a vigorously agitated suspension of 60 parts by weight of cotton linters ground to pass a 40-mesh screen in 850 parts by volume of substantially anhydrous tert-amyl alcohol was added 96 parts by weight of 25% aqueous sodium hydroxide over a period of 10 minutes, and agitation was continued at room temperature for 1 hour, after which a solution of 17.8 parts by weight of ethylene oxide in 50 parts by volume of substantially anhydrous tert-amyl alcohol was added. The reaction mixture was heated with continued agitation to a temperature of approximately 65° C. in 1 hour and was held at this temperature for 5 more hours with agitation. At this stage, the reaction mixture was a suspension with the hydroxyethyl cellulose thus produced suspended in substantially the same particulate form as the starting cellulose. The hydroxyethyl cellulose was recovered from the reaction mixture by the recovery procedure given in Example 1.

The product was found to have a substitution of about 0.65 hydroxyethyl group for each anhydroglucose unit in the cellulose. A 2% solution of the product in 5% aqueous sodium hydroxide was clear, smooth, and substantially free of insoluble fibers, thus indicating a very uniform product of excellent solubility characteristics.

In the first step of the process for the preparation of hydroxyalkyl cellulose ether according to this invention, the cellulosic material in particulate form is mixed with an alcohol of the group consisting of the secondary 3-carbon and secondary and tertiary 4-carbon and 5-carbon aliphatic alcohols and mixtures thereof in the presence of alkali.

The cellulosic material may be any appropriate cellulose raw material such as chemical cotton, cotton linters, or wood pulp of the type conventionally used in chemical reactions. The cellulosic material may be bulk dried, sheet dried, pretreated with alkali, or otherwise prepared for reduction to particles sufficiently small to permit reaction thereon by the reactants. The cellulosic material may be ground in an attrition mill or similar device to fine particles, or it may be shredded, fluffed, or otherwise treated. In any of these forms, the cellulosic material is in a particulate form suitable for the purposes of this invention. The ground, shredded, fluffed, or otherwise treated cellulosic material constitutes a loose aggregate of individual fibers which, upon mixing with the alcoholic medium of the reaction mixture, can be readily mixed, stirred, or agitated, and the fibers do not mat together or persist in the form of pellets or dense matted aggregates of fibers which cannot readily be reached and reacted upon by the reactants. The ideal state for the purposes of this invention is to have the cellulosic material suspended in the alcoholic medium, thus forming a slurry. Upon stirring or agitating such a suspension or slurry, the individual fibers or particles move about in the reaction mixture and are not unduly handicapped in such movement by the other fibers or particles.

The alcohols utilized are of the group consisting of the secondary 3-carbon and secondary and tertiary 4-carbon and 5-carbon aliphatic alcohols; namely, 2-propanol (isopropanol), 2-butanol (sec-butyl alcohol), 2-methyl-2-propanol (tert-butyl alcohol), 2-pentanol (methylpropyl carbinol or sec-active amyl alcohol), 3-pentanol (diethyl carbinol), 3-methyl-2-butanol (methyl isopropyl carbinol or sec-isoamyl alcohol), and 2-methanol-2-butanol (dimethylethyl carbinol or tert-amyl alcohol).

These alcohols are not solvents for the starting cellulose material or for the hydroxyalkyl cellulose ethers formed. Thus, they perform the function of a nonsolvent reaction medium in which the cellulosic material in particulate form is reacted upon by etherifying agents to form cellulose ethers, and in which the cellulosic material is maintained in particulate form throughout the reaction. In other words, the identity of the particulate form of the starting material is not lost during the reaction.

Although it is not intended that the invention should be limited to any particular theory of operation, it appears that the alcohols utilized in accordance with this invention function to distribute the alkali and water uniformly on the cellulosic material. These alcohols all show some measure of water miscibility and in conjunction with this dissolved water, dissolve small amounts of caustic alkali. It is believed that because the alcoholic diluent can dissolve aqueous alkali in small amounts, it is able to transfer the alkali from portions of the cellulose which are rich in alkali to those portions which are lean in alkali. This process probably goes on until good uniformity of distribution is attained. The distribution may continue during the etherification reaction. This is in contrast to such non-solvent diluents as benzene, toluene, etc., in which aqueous alkali is completely insoluble, for such diluents lead to hydroxy-alkyl cellulose ethers having poor uniformity and poor solubility characteristics. Moreover, it is believed that because the alcohols of this invention dissolve only small amounts of aqueous alkali, a major part of the aqueous alkali remains on the cellulosic material and only a minor amount is present in the diluent where it can promote undesired side reactions. This is in contrast to such alcohols as methyl and ethyl alcohols which dissolve so much alkali that side reactions in the diluent become excessive.

The alcohols according to this invention will be utilized in a quantity sufficient to prevent the cellulose ether formed from going into solution in the reaction mixture. This represents the minimum quantity and amounts to about 2 parts by weight of alcoholic medium for each part by weight of water present in the reaction mixture. As a rule, somewhat more will be used to provide for free agitation of the mixture. An unlimited quantity can be used, subject only to the inconveniences of unnecessary dilution. In general, a ratio of alcohol to cellulose maintained between about 2 and about 50 parts of alcohol to 1 part of cellulose and preferably between about 10 and about 25 parts of alcohol to 1 part of cellulose will be found to give satisfactory results.

The alcohol may be in the anhydrous form as added or it may contain a certain amount of water, such as, for example, the constant boiling mixture in which it is obtained on separation from water. It will be understood, of course, that if water is added in the alcohol, due allowance must be made therefor so that the reaction mixture has the desired total water content. The alcohols may be used singly or admixtures of two or more alcohols may be employed as desired.

The alkali present in the reaction mixture is usually sodium hydroxide. However, any of the strong alkali hydroxides, including potassium hydroxide, are suitable. Any amount of alkali may be used in the process of the present invention as long as a hydroxyalkyl ether insoluble in the reaction mixture is obtained. Ordinarily, the caustic content should be within a range from about 0.05 to about 10 parts of caustic per part of cellulose and preferably from about 0.2 to about 0.5 part per part of cellulose. The amount and concentration of alkali with respect to water are factors governing the substitution of the final product. The water content of the reaction mixture may be varied from about 0.02 to about 3.0 parts of caustic per part of water and preferably from about 0.04 to about 1.0 part caustic per part of water.

Within these general ranges as set forth above, preferred conditions for optimum operation have been established for an arbitrary dilution system containing about 15 parts by volume of alcohol per part by weight of cellulose. Under this dilution condition, an optimum caustic to cellulose ratio is about 0.3 to about 0.4 part caustic per part of cellulose with a corresponding optimum of water to cellulose ratio between about 1.6 and about 2.0 parts of water per part of cellulose. Thus, by correlation of these ratios, it is apparent that an optimum ingredient ratio for this degree of dilution is about 2 parts of 15 to 20% aqueous sodium hydroxide per part of cellulose. It will be understood, of course, that changes in the concentration of the alkali solution will give corresponding and compensating minor changes in the optimum conditions of caustic and water content for the reaction.

As set forth in the examples, the cellulosic material in suitable particulate form is suspended or mixed with the alcoholic medium of the reaction mixture with agitation, and the alkali solution is added with agitation. This is the preferred mode of operation and thus dispenses with the separate preparation of alkali cellulose. However, if desired, alkali cellulose can be prepared separately, as in many etherification reactions, and this alkali cellulose in ground, shredded, fluffed, or other suitable particulate form can then be mixed with the alcoholic medium or, if desired, the alkali solution can first be mixed with the alcoholic medium of the reaction mixture and the cellulosic material in suitable particulate form added thereto.

Agitation or mixing is important in order to assure uniform distribution in the reaction mixture. In the preferred mode of operation where the cellulosic material is suspended in the alcoholic medium to form a slurry, mixing is readily accomplished by means of paddle stirrers, turbo mixers, and the like, or by simple tumbling in a suitable reaction vessel. If desired, mixing may be accomplished in shredders, dough mixers, Werner-Pfleiderer mixers, or the like.

In the second step of the process in accordance with this invention, the cellulosic material in particulate form is reacted in the presence of the alkali and the alcohol with a hydroxyalkylating agent.

This invention is concerned with the preparation of any hydroxyalkyl cellulose ether which is insoluble in the alcohols used in the reaction medium. This includes all alkali-soluble and water-soluble hydroxyalkyl ethers of cellulose, such as hydroxyethyl cellulose, hydroxypropyl cellulose, hydroxybutyl cellulose, and substituted variations in the alkyl group, and others derived by etherifying cellulose with such hydroxyalkylating agents as ethylene oxide, propylene oxide, butylene oxide, glycide, epichlorohydrin, butadiene monoxide, ethylenechlorohydrin, and the like, or with mixtures of these.

The quantity of hydroxyalkylating agent will be varied with the substitution desired in the product. In general, the hydroxyalkylating agent will be used in a quantity of at least 0.1 mole per mole of cellulose. There is no upper limit to the quantity of hydroxyalkylating agent which may be employed. Within the broad range of operability, optimum quantities will be between about 0.4 mole and about 20 moles of hydroxyalkylating agent per mole of cellulose. When preparing hydroxyethyl cellulose with ethylene oxide, at least 0.025 part of ethylene oxide per part of cellulose will be employed. There is no upper limit, but within the broad range of operability, optimum quantities will be between about 0.1 and about 5.0 parts ethylene oxide per part of cellulose by weight.

In general, it has been found that desirable properties are imparted to the hydroxyalkyl cellulose ethers in accordance with this invention over a wide range of substitution. The lower limit of substitution will be at least about 0.05 hydroxyalkyl group per anhydroglucose unit. In terms of the available hydroxyls in the cellulosic material, the upper limit of substitution is a fully substituted cellulose molecule. Within the broad range of operability, it has been found, for example, that a hydroxyalkyl cellulose of optimum general properties has a degree of substitution from about 0.10 to about 2.0 hydroxyalkyl group for each anhydroglucose unit in the cellulose. As set forth and described herein, the cellulose ether according to this invention is characterized by a very uniform solubility throughout this broad range of substitution, despite the fact that the cellulosic material is maintained in particulate form throughout the entire reaction.

As illustrated by the examples, low boiling hydroxyalkylating agents such as ethylene oxide are conveniently added to the reaction mixture in the form of a solution in the same alcohol employed as the reaction medium. This is advantageous since neither gas-tight equipment nor refrigeration is needed to retain highly volatile hydroxyalkylating agent. However, the hydroxyalkylating agent may, if desired, be added directly to the reaction mixture without previously dissolving it in the alcohol.

In the same manner that variation of proportion and ratios of ingredients is possible, it is apparent that reaction temperatures and conditions for the hydroxyalkylation reaction may be varied within relatively wide limits. Thus, for example, the reaction temperature may be between about 20° C. and about 150° C. and the reaction time varied correspondingly, being relatively long, for example, at a low temperature such as 20° C. and being substantially shorter, for example, at a high temperature. For optimum ease and efficiency of operation, a preferred reaction temperature for preparing hydroxyethyl cellulose is generally in the range from about 50° C. to about 75° C., at which temperature a reaction time from about 5 to about 6 hours is found to be adequate. Other hydroxyalkyl celluloses, such as, for example, hydroxypropyl cellulose, require relatively higher reaction temperatures and longer reaction times than hydroxyethyl cellulose, as illustrated by Example 9.

In the third step of the process in accordance with this invention, the hydroxyalkyl cellulose ether is obtained in substantially the same particulate form as the starting cellulosic material. The product is recovered in a simple manner merely by draining off reaction medium, or removing it more completely by centrifuging, or pressing, or the like, since the product is in substantially the same particulate form as the starting cellulosic material and is insoluble in the reaction mixture. It is readily purified by washing with a non-solvent for the hydroxyalkyl cellulose, such as aqueous methanol or ethanol, which will leach out the by-products. Preferably the washing medium should contain a small amount of water, not more than about 30%, in order to facilitate removal of by-product salts. A convenient washing medium is aqueous methanol containing 70% methanol and 30% water. Thus, for example, the product ether in particulate form, after draining off the reaction medium, is stirred in 70% methanol, free alkali is neutralized with acetic acid, and the alcoholic wash liquor is drained off. Additional alcoholic washes may be necessary or desirable to further purify the cellulose ether. Usually it is desirable to wash at least once with anhydrous methanol for the purpose of dehydrating the product. Simple air drying provides a dry material ready for shipment and use in a form which dissolves very readily to form smooth, clear solutions, substantially free of insoluble fibers.

An alternate method of purification may be employed for hydroxyalkyl celluloses of low degree of substitution which are soluble only in aqueous alkali solutions, for example, ethers containing less than about 0.5 hydroxyalkyl group per anhydroglucose unit in the cellulose. By this alternate method, the hydroxyalkyl ether slurry is neutralized in the original reaction mixture, the reaction mixture liquors are drained off, and the product is then washed with water until purified.

It will at once be apparent to those skilled in the art that numerous modifications and variations in the operating procedure may be made within the scope of the invention and without departing therefrom. Thus, for example, conventional methods of preparing an alkali cellulose may be employed and such conventional methods are well known in the art. Likewise, it will be apparent that variety of choice is available in the selection of the hydroxyalkylating agent and in the same manner, methods of purification and isolation of the resulting cellulose ether, when such purification or isolation is desired, will be apparent to those skilled in the art and the selection of ingredients and conditions for the various steps may readily be made.

The cellulose ethers prepared in accordance with this invention may be employed as general thickening agents, pigment dispersing materials, emulsion stabilizers, printing paste additives, adhesives and binders, textile finishing agents, film-forming agents, creaming agents, pharmaceutical preparations, paper sizes, and the like. They may also be employed as the starting material for the preparation of mixed cellulose ethers and cellulose ether esters containing hydroxyalkyl substituent groups.

What we claim and desire to protect by Letters Patent is:

1. In the manufacture of ethers of cellulose, the improvement which comprises mixing cellulosic material in particulate form with an alcohol of the group consisting of the secondary 3-carbon and secondary and tertiary 4-, and 5-carbon aliphatic alcohols and mixtures thereof in the presence of alkali and water, employing at least about 2 parts by weight of said alcohol for each part by weight of water which is present, reacting said cellulosic material in particulate form and in the presence of the alkali, the water and the alcohol with a hydroxyalkylating agent, and obtaining the hydroxyalkyl cellulose ether thus produced in substantially the same particulate form as the starting cellulosic material.

2. In the manufacture of ethers of cellulose, the improvement which comprises mixing cellulosic material in particulate form with an alcohol of the group consisting of the secondary 3-carbon and secondary and tertiary 4-, and 5-carbon aliphatic alcohols and mixtures thereof in the presence of alkali and water, employing at least about 2 parts by weight of said alcohol for each part by weight of water which is present, reacting said cellulosic material in particulate form and in the presence of the alkali, the water and the alcohol with ethylene oxide, and recovering the hydroxyethyl cellulose thus produced in substantially the same particulate form as the starting cellulosic material from the reaction mixture.

3. In the manufacture of ethers of cellulose, the improvement which comprises mixing cellulosic material in particulate form with an alcohol of the group consisting of the secondary 3-carbon and secondary and tertiary 4-, and 5-carbon aliphatic alcohols and mixtures thereof in the presence of alkali and water, employing at least about 2 parts by weight of said alcohol for each part by weight of water which is present, reacting said cellulosic material in particulate form and in the presence of the alkali, the water and the alcohol with propylene oxide, and recovering the hydroxypropyl cellulose thus produced in substantially the same particulate form as the starting cellulosic material from the reaction mixture.

4. In the manufacture of ethers of cellulose, the improvement which comprises mixing cellulosic material in particulate form with an alcohol of the group consisting of the secondary 3-carbon and secondary and tertiary 4-, and 5-carbon aliphatic alcohols and mixtures thereof in the presence of alkali and water, employing at least about 2 parts by weight of said alcohol for each part by weight of water which is present, reacting said cellulosic material in particulate form and in the presence of the alkali, the water and the alcohol with ethylenechlorohydrin, and recovering the hydroxyethyl cellulose thus produced in substan- 5. In the manufacture of ethers of cellulose, the improvement which comprises mixing cellulosic material in particulate form with an alcohol of the group consisting of the secondary 3-carbon and secondary and tertiary 4-, and 5-carbon aliphatic alcohols and mixtures thereof in the presence of alkali and water, reacting said cellulosic material in particulate form with ethylene oxide and in the presence of the alkali, the water and the alcohol in an amount to maintain the hydroxyethyl cellulose thus produced in particulate form, employing at least about 2 parts by weight of said alcohol for each part by weight of water which is present, and recovering the hydroxyethyl cellulose thus produced in substantially the same particulate form as the starting cellulosic material from the reaction mixture.

6. In the manufacture of ethers of cellulose, the improvement which comprises mixing cellulosic material in particulate form with an alcohol of the group consisting of the secondary 3-carbon and secondary and tertiary 4-, and 5-carbon aliphatic alcohols and mixtures thereof in the presence of alkali and water, reacting said cellulosic material in particulate form with propylene oxide and in the presence of the alkali, the water and the alcohol in an amount to maintain the hydroxypropyl cellulose thus produced in particulate form, employing at least about 2 parts by weight of said alcohol for each part by weight of water which is present, and recovering the hydroxypropyl cellulose thus produced in substantially the same particulate form as the starting cellulosic material from the reaction mixture.

7. In the manufacture of ethers of cellulose, the improvement which comprises mixing cellulosic material in particulate form with an alcohol of the group consisting of the secondary 3-carbon and secondary and tertiary 4-, and 5-carbon aliphatic alcohols and mixtures thereof in the presence of alkali and water, reacting said cellulosic material in particulate form with ethylenechlorohydrin and in the presence of the alkali, the water and the alcohol in an amount to maintain the hydroxyethyl cellulose thus produced in particulate form, employing at least about 2 parts by weight of said alcohol for each part by weight of water which is present, and recovering the hydroxyethyl cellulose thus produced in substantially the same particulate form as the starting cellulosic material from the reaction mixture.

8. In the manufacture of ethers of cellulose, the improvement which comprises mixing cellulosic material in particulate form with isopropyl alcohol in the presence of alkali and water, reacting said cellulosic material in particulate form with ethylene oxide and in the presence of the alkali, the water and the alcohol in an amount to maintain the hydroxyethyl cellulose thus produced in particulate form, employing at least about 2 parts by weight of said alcohol for each part by weight of water which is present, and recovering the hydroxyethyl cellulose thus produced in substantially the same particulate form as the starting cellulosic material from the reaction mixture.

9. In the manufacture of ethers of cellulose, the improvement which comprises mixing cellulosic material in particulate form with tert-butyl alcohol in the presence of alkali and water, reacting said cellulosic material in particulate form with ethylene oxide and in the presence of the alkali, the water and the alcohol in an amount to maintain the hydroxyethyl cellulose thus produced in particulate form, employing at least about 2 parts by weight of said alcohol for each part by weight of water which is present, and recovering the hydroxyethyl cellulose thus produced in substantially the same particulate form as the starting cellulosic material from the reaction mixture.

10. In the manufacture of ethers of cellulose, the improvement which comprises mixing cellulosic material in particulate form with tert-amyl alcohol in the presence of alkali and water, reacting said cellulosic material in particulate form with ethylene oxide and in the presence of the alkali, the water and the alcohol in an amount to maintain the hydroxyethyl cellulose thus produced in particulate form, employing at least about 2 parts by weight of said alcohol for each part by weight of water which is present; and recovering the hydroxyethyl cellulose thus produced in substantailly the same particulate form as the starting cellulosic material from the reaction mixture.

EUGENE D. KLUG.
HOWARD G. TENNENT.

REFERENCES CITED

The following references are of record in the file of this patent:

UNITED STATES PATENTS

| Number | Name | Date |
|---|---|---|
| 2,170,009 | Clarke et al. | Aug. 22, 1939 |
| 2,512,338 | Klug et al. | June 20, 1950 |

FOREIGN PATENTS

| Number | Country | Date |
|---|---|---|
| 503,942 | Great Britain | 1939 |